US008467487B2

(12) United States Patent
Garner et al.

(10) Patent No.: US 8,467,487 B2
(45) Date of Patent: Jun. 18, 2013

(54) NETWORK SYNCHRONIZATION METHOD AND APPARATUS FOR PERFORMING TIME SYNCHRONIZATION BETWEEN NODES

(75) Inventors: Geoffrey M. Garner, Red Bank, NJ (US); Hyunsurk Ryu, Suwon-si (KR); Keun Joo Park, Seoul (KR); Jun Haeng Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 12/780,281

(22) Filed: May 14, 2010

(65) Prior Publication Data

US 2010/0290572 A1 Nov. 18, 2010

Related U.S. Application Data (60) Provisional application No. 61/179,029, filed on May 18, 2009.

(30) Foreign Application Priority Data

Nov. 12, 2009 (KR) .................. 10-2009-0109009

(51) Int. Cl.
H04L 7/00 (2006.01)
(52) U.S. Cl.
USPC ........................................ 375/356; 375/371
(58) Field of Classification Search
USPC .................. 375/356, 371, 354; 370/503
See application file for complete search history.

(56) References Cited

U.S. PATENT DOCUMENTS

| 5,689,688 | A * | 11/1997 | Strong et al. ............. 713/375 |
| 6,157,957 | A * | 12/2000 | Berthaud ................. 709/248 |
| 6,920,155 | B2 | 7/2005 | Rao | |
| 7,072,432 | B2 | 7/2006 | Belcea | |
| 7,551,647 | B2 | 6/2009 | Fellman et al. | |
| 2006/0251084 | A1* | 11/2006 | Elliot ..................... 370/398 |
| 2007/0025481 | A1* | 2/2007 | Ryu et al. ................ 375/354 |
| 2007/0266119 | A1* | 11/2007 | Ohly ..................... 709/220 |
| 2008/0080563 | A1 | 4/2008 | Kataria et al. | |
| 2010/0020909 | A1* | 1/2010 | Jung et al. .............. 375/371 |

FOREIGN PATENT DOCUMENTS

| KR | 10-2007-0070299 | 7/2007 |
| KR | 10-2008-0069106 | 7/2008 |
| WO | WO 2008/044193 | 4/2008 |

* cited by examiner

*Primary Examiner* — Shuwang Liu
*Assistant Examiner* — Helene Tayong
(74) *Attorney, Agent, or Firm* — NSIP Law (57) ABSTRACT

Provided is a network synchronization method and apparatus for performing a time synchronization between nodes. When a system starts up and the time synchronization between the nodes is initiated, the network synchronization method and apparatus may enhance jitter, wander, and a time synchronization performance by gradually increasing a window size for a propagation time measurement. When a full window of propagation time measurements is collected, the network synchronization method and apparatus may enhance jitter, wander, and the time synchronization performance by applying an exponential to a computation of an average propagation time value.

17 Claims, 9 Drawing Sheets

NETWORK SYNCHRONIZATION METHOD AND APPARATUS FOR PERFORMING TIME SYNCHRONIZATION BETWEEN NODES

CROSS-REFERENCE TO RELATED APPLICATIONS

This application claims the benefit under 35 U.S.C. §119 of U.S. Provisional Application No. 61/179,029, filed on May 18, 2009, in the U.S. Patent and Trade Mark Office, and Korean Patent Application No. 10-2009-0109009, filed on Nov. 12, 2009, in the Korean Intellectual Property Office, the entire disclosure of each of which is incorporated herein by reference for all purposes.

BACKGROUND

1. Field

The following description relates to a network synchronization method and apparatus for performing a time synchronization between nodes.

2. Description of Related Art

A variety of schemes to transmit timing between nodes of a network using time stamps exist.

In such schemes, each of nodes constituting the network attempts time synchronization with a single node among the nodes included in the network. The single node is known as a grandmaster. Specifically, in such schemes, timings is traceable to a grandmaster.

Each node, except for the grandmaster node, contains a single slave port and possibly one or more master ports. The grandmaster node contains one or more master ports, but no slave ports. Master ports transmit messages including time stamps to all nodes connected to the master ports. For example, the time stamps may be the time when the messages are transmitted. If the port at the other end of the link attached to a master port is a slave port, it receives the time stamp and adds the propagation time between the slave port and the master port to the time stamp. The slave port also time stamps the message on receipt, relative to its local clock. Then, the node that contains the slave port, i.e., the slave node, compares the received time stamp with propagation time added with the time stamp of the message on receipt. The slave node then computes the offset, i.e., the difference between the time stamp of the message on receipt and the received time stamp with propagation time added, and thereby perform a time synchronization. In this instance, the offset corresponds to the difference between master node and slave node time. Each node that sends messages through a master port to synchronize a slave node is known as a master node. Each master node, except for the grandmaster, is also a slave node to another master node.

SUMMARY

One or more embodiments may provide a network synchronization method and apparatus that may enhance jitter, wander, and a time synchronization performance by gradually increasing a window size for a propagation time measurement when a system starts up and then a time synchronization between nodes is initiated.

One or more embodiments may also provide a network synchronization method and apparatus that may enhance jitter, wander, and a time synchronization performance by applying an exponential weight to a computation of an average propagation time value when a full window of propagation time measurements is collected.

In one general aspect, there is provided a synchronization method, including: measuring a propagation time from a slave node to a master node at a $k^{th}$ time step where k denotes a natural number; computing an average propagation time value at a $(k+1)^{th}$ time step according to a first computation formula, when k is less than a sliding window size, and computing the average propagation time value at the $(k+1)^{th}$ time step according to a second computation formula, when k is greater than or equal to the sliding window size; and computing an offset based on a message transmission time at the master node, a message receipt time at the slave node, and the average propagation time value.

The first computation formula and the second computation formula may compute the average propagation time value at the $(k+1)^{th}$ time step using an average propagation time value at the $k^{th}$ time step and the propagation time measured at the $k^{th}$ step time.

The first computation formula may be computed according to the following equation:

$$x_{k+1} = \frac{kx_k + d_k}{k+1},$$

where $x_k$ denotes the average propagation time value at the $k^{th}$ time step and $d_k$ denotes the propagation time measured at the $k^{th}$ time step.

The second computation formula may be computed according to the following equation:

$$x_{k+1} = ax_k + (1-a)d_k,$$

where $x_k$ denotes the average propagation time value at the $k^{th}$ time step, $d_k$ denotes the propagation time measured at the $k^{th}$ time step, and a denotes a filter coefficient of a first-order digital filter.

For example, a may be increased as the sliding window size increases.

Also, a may be computed according to the following equation:

$$a = e^{-1/M}$$

where M denotes the sliding window size.

Also, a may be computed according to the following equation:

$$a = e^{-P/M}$$

where M denotes the sliding window size and P denotes a constant.

According to embodiments, when a system starts up and a time synchronization between nodes is initiated, it is possible to enhance jitter, wander, and a time synchronization performance by gradually increasing a window size for a propagation time measurement.

Also, according to embodiments, it is possible to enhance jitter, wander, and a time synchronization performance by applying an exponential weight to a computation of an average propagation time value when a full window of propagation time measurements is collected.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
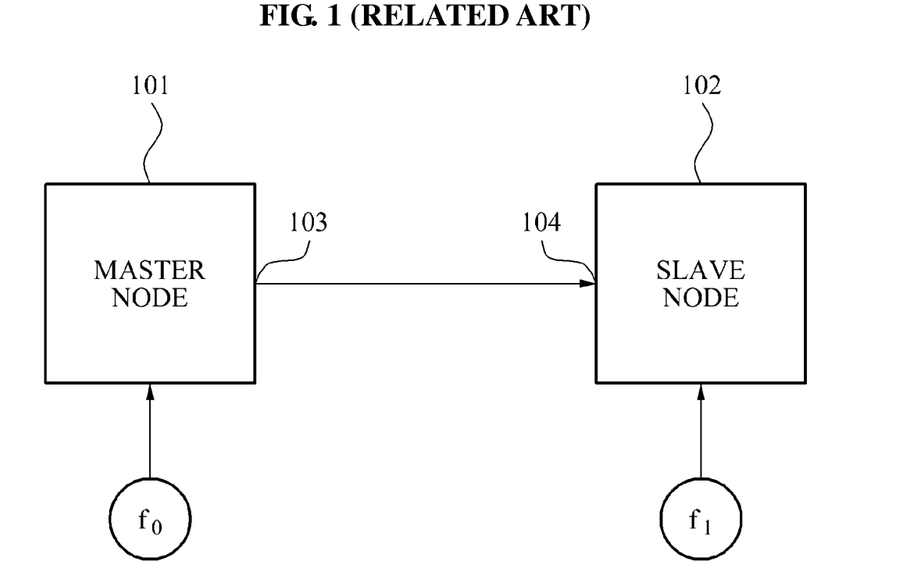
FIG. 1 illustrates an example of computing a propagation time according to a related art.

FIG. 1 illustrates an example of computing a propagation time according to a related art.

Referring to FIG. 1, a master node 101 may transmit a message to a slave node 102. A time stamp T1 may be stored in the message. The time stamp T1 is a time 103 when the master node 101 transmits the message. When receiving the message, the slave node 102 may confirm a receipt time T2 that is a time 104, relative to the slave node's local clock, when the message is received. When the slave node 102 is aware of a propagation time D1 from the master node 101, the slave node 102 may compute an offset using "offset=T2−T1−D1." The offset corresponds to a difference between the master node 101 time and the slave node 102 time. Accordingly, the slave node 102 may perform a time synchronization with the master node 101 using the offset.

However, to compute the offset as described above, the slave node 102 may need to be aware of the propagation time D1 from the master node 101. Specifically, the slave node 102 may need to compute the propagation time D1.

Figure 2:
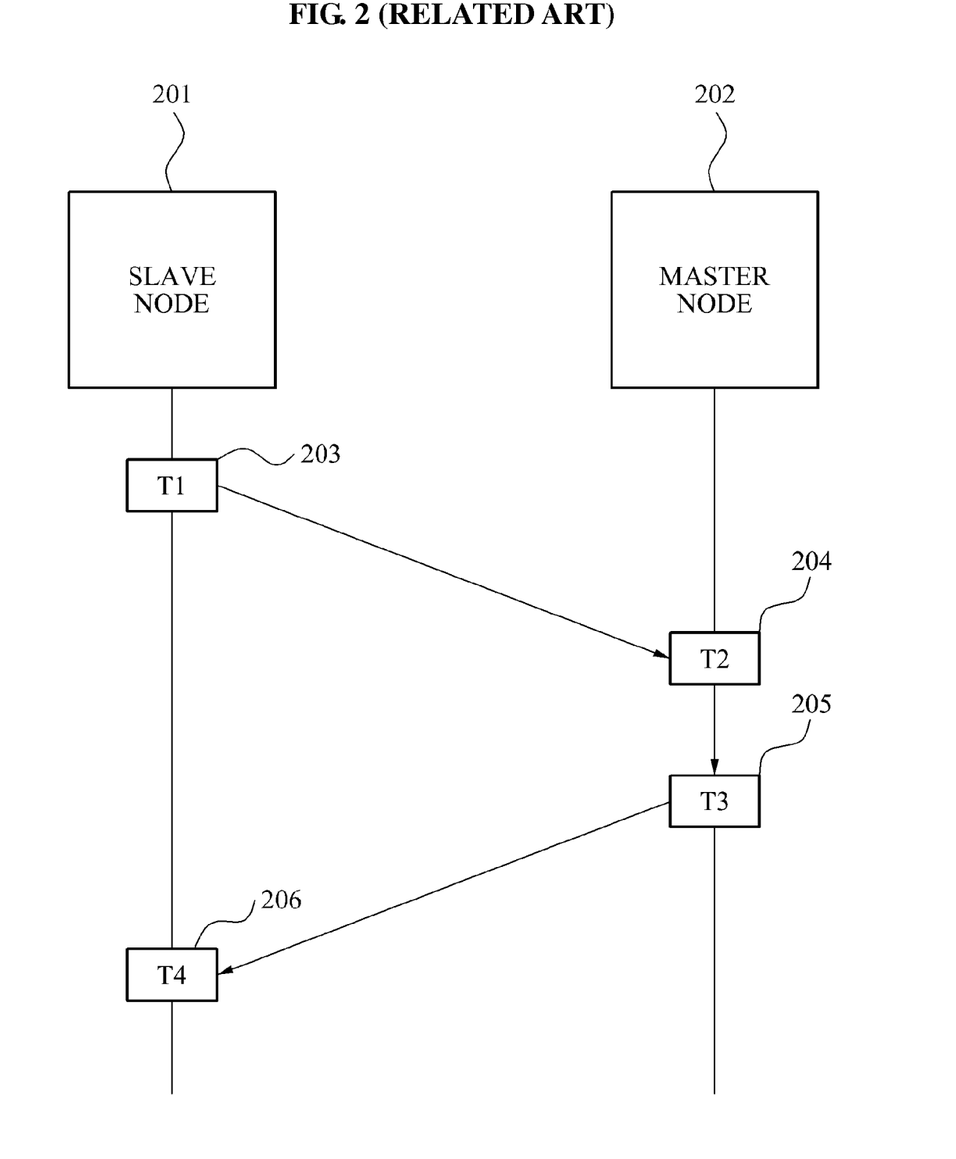
FIG. 2 illustrates another example of computing a propagation time according to the related art.

FIG. 2 illustrates another example of computing a propagation time according to the related art.

Referring to FIG. 2, a propagation time between clocks attached to two nodes, that is, a slave node 201 and a master node 202 may be measured by the clocks exchanging time stamps. A requester, which is one of the clocks, may store a transmission time T1 203 of a first message in the first message when the requestor transmits the first message to another clock. The other clock corresponding to a responder may store a receipt time T2 204 of the first message.

After storing the receipt time T2 204, the responder may transmit a second message corresponding to the first message to the requester. The responder may store a transmission time T3 205 of the second message in the second message when transmitting the second message. The requester may confirm a receipt time T4 206 of the second message.

The requester may measure the propagation time using the transmission time T1 203 of the first message, the receipt time T2 204 of the first message, the transmission time T3 205 of the second message, and the receipt time T4 206 of the second message. The propagation time may be computed according to the following Equation 1.

[Equation 1]

$$\text{Propagation time} = ((T2-T1)+(T4-T3))/2$$

For example, it is presumed that the propagation time measurement scheme satisfies the following conditions:

(1) The propagation time is symmetrical. That is, the propagation time is identical in both directions.

(2) The propagation time is stable. That is, over the timescale to obtain the above-described four time stamps, for example, the time interval T4−T1, the propagation time is constant.

(3) A frequency difference between the slave node 201 and the master node 202 is small.

(4) Time stamp values are accurate.

However, the first condition that the propagation time is symmetrical and the second condition that the propagation time is stable indicate that a source of a variable delay between the requester and the responder may not exist. Specifically, there may be a relay device such as a network switch or a network bridge between the slave node 201 and the master node 202. The existence of the above relay device may cause inaccuracy in jitter, wander, and a time synchronization.

When there exists a network switch or a network bridge between the slave node 201 and the master node 202, a propagation time variation and/or a propagation time asymmetry may result. To mitigate the propagation time variation and the propagation time asymmetry, the relay device such as the network switch or the network bridge may store a receipt time and a transmission time of each message in the message. Accordingly, the relay device includes a clock and a time stamping hardware, known collectively as a transparent clock. However, a transparent clock requires time stamping capability, and not all relay devices have this capability. In addition, the measured propagation time may not be symmetric due to time stamp error (e.g., the time stamps may have some inaccuracy, see the fourth condition above).

Figure 3:
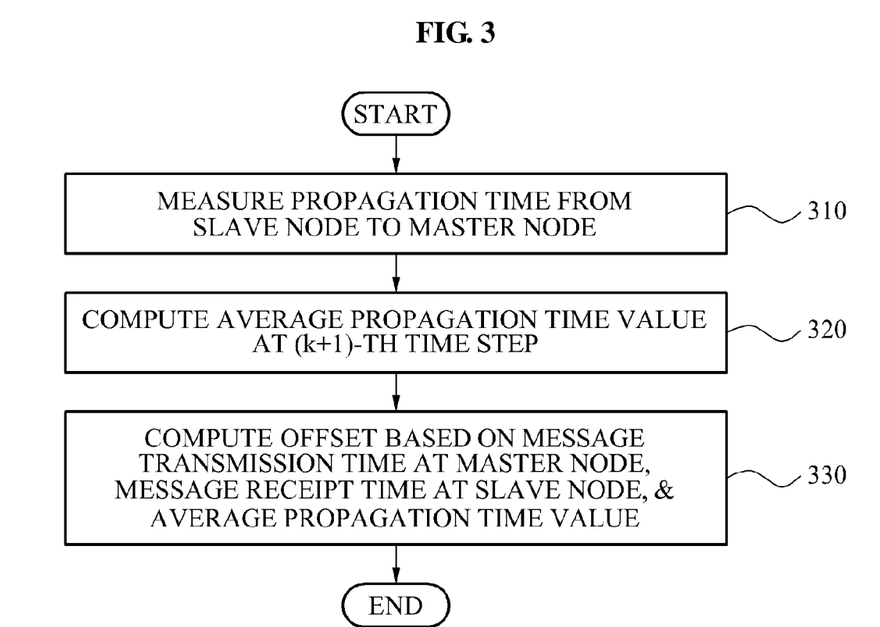
FIG. 3 illustrates a flowchart of a method of measuring a propagation time according to an embodiment.

FIG. 3 illustrates a method of measuring a propagation time according to an embodiment.

According to an embodiment, the propagation time measurement method may average propagation time measurement values, and use the computed average value as a value to estimate an actual propagation time $D_{ave,k}$. Accordingly, an offset may be computed using "offset=T2−T1−$D_{ave,k}$."

The propagation time measurement method of FIG. 3 may be performed at a network apparatus that operates as a slave. Hereinafter, the network apparatus that operates as the slave is referred to as a slave node. A network apparatus that operates as a master is referred to as a master node.

In operation 310, the slave node may measure a propagation time from the slave node to the master node. The propagation time from the slave node to the master node may be a sum or an average of a propagation time T2−T1 from the slave node to the master node and a propagation time T4−T3 from the master node to the slave node. The propagation time measurement may be performed k times every predetermined time unit. For example, k denotes a natural number. To measure the propagation time at a $k^{th}$ time unit may be used for the same meaning as to measure the propagation time at a $k^{th}$ time step. For example, the slave node may measure the propagation time from the slave node to the master node at the $k^{th}$ time step.

In operation 320, the slave node may compute an average propagation time value at a $(k+1)^{th}$ time step. In operation 320, when k is less than a sliding window size, the slave node may compute the average propagation time value at the $(k+1)^{th}$ time step according to a first computation formula. When k is greater than or equal to the sliding window size, the slave may compute the average propagation time value at the $(k+1)^{th}$ time step according to a second computation formula. For example, "sliding window" may also be briefly expressed as "window." The sliding window size M may indicate a number of times that the measured propagation time is stored. M denotes a natural number. The sliding window size M may be associated with a size of a buffer included in the slave node.

Figure 4:
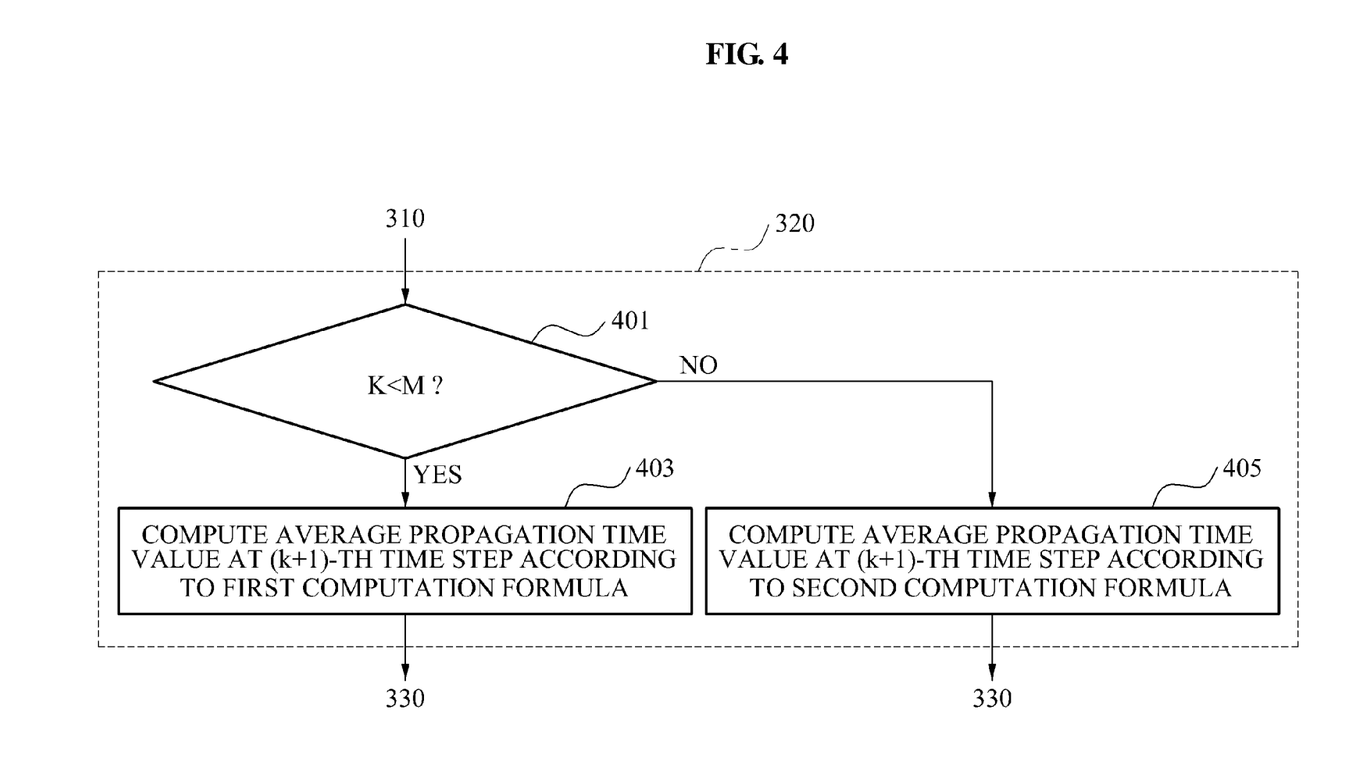
FIG. 4 illustrates a detailed process of computing an offset of FIG. 3.

Operation 320 may include operations 401, 403, and 405 of FIG. 4.

In operation 401, the slave node may determine whether k corresponding to a previous time step of the $(k+1)^{th}$ time step is less than the sliding window size M. When k<M, operation 403 may be performed. Conversely, when k≧M, operation 405 may be performed.

In operation 403, the slave node may compute the average propagation time value at the $(k+1)^{th}$ time step according to the first computation formula.

In operation 405, the slave node may compute the average propagation time value at the $(k+1)^{th}$ time step according to the second computation formula. For example, the first computation formula and the second computation formula compute the average propagation time value at the $(k+1)^{th}$ time step using an average propagation time value at the $k^{th}$ time step and the propagation time measured at the $k^{th}$ step time.

The first computation formula is associated with "gradually increasing a window size for a propagation time measurement when a system starts up and a time synchronization between nodes is initiated." The second computation formula is associated with "applying an exponential weight to a computation of an average propagation time value when a full window of propagation time measurements is collected."

The first computation formula may be defined by the following Equation 2.

$$x_{k+1} = \frac{kx_k + d_k}{k+1},$$ [Equation 2]

where $x_k$ denotes the average propagation time value at the $k^{th}$ time step and $d_k$ denotes the propagation time measured at the $k^{th}$ time step. For example, for the computation of the above Equation 2, the slave node may include a unit to store the average propagation time value $x_k$ or $kx_k$ at the $k^{th}$ time step.

The second computation formula may be defined by the following Equation 3.

[Equation 3]

$$x_{k+1} = ax_k + (1-a)d_k,$$

where $x_k$ denotes the average propagation time value at the $k^{th}$ time step, $d_k$ denotes the propagation time measured at the $k^{th}$ time step, and a denotes a filter coefficient of a first-order digital filter. For the computation of the above Equation 3, the slave node may include a unit to store the average propagation time value $x_k$ at the $k^{th}$ time step. The above Equation 3 may be computed using the first-order digital filter, for example, an infinite impulse response (IIR) filter.

In the above Equation 3, a may be set to increase as the sliding window size M increases. Accordingly, a may be computed according to either of the following Equation 4 or Equation 5:

[Equation 4]

$$a = e^{-1/M}$$

[Equation 5]

$$a = e^{-P/M},$$

where P denotes a constant. The above Equation 5 may be obtained by generalizing the above Equation 4.

The sliding window size M may be selected to be relatively large compared to a number of samples over which the propagation time $d_k$ measured at the $k^{th}$ time step varies. Also, the sliding window size M may be selected to be relatively large compared to a time scale of a variation of an actual propagation time of a message. In any case, M may be set to 1000, however, may not be limited thereto.

In operation 330, the slave node may compute an offset based on a message transmission time at the master node, a message receipt time at the slave node, and the average propagation time value. The offset may be computed using "offset=T2−T1−$D_{ave,k}$." In this instance, each of the slave node and the master node may compute and maintain the average propagation time value.

Figure 5:
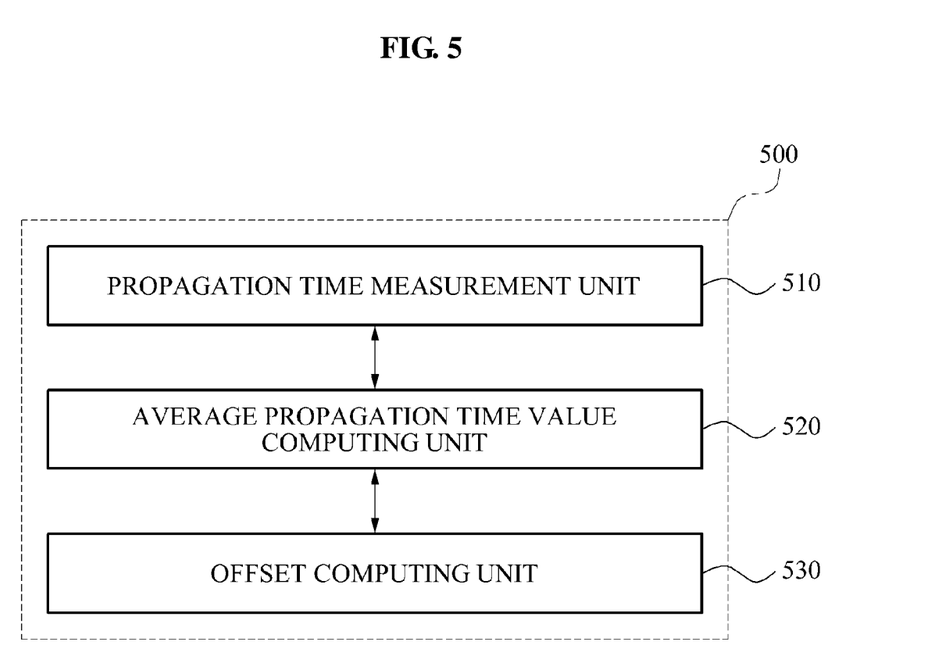
FIG. 5 illustrates a configuration of a network apparatus according to an embodiment.

FIG. 5 illustrates an example of a network apparatus 500.

The network apparatus 500 may operate as a slave node.

The network apparatus 500 may include a propagation time measurement unit 510, an average propagation time value computing unit 520, and an offset computing unit 530.

The propagation time measurement unit 510 may measure a propagation time from a slave node to a master node at a $k^{th}$ time step. For example, k denotes a natural number. The propagation time measurement unit 510 may measure the propagation time from the slave node to the master node using a time stamp. To measure the propagation time at a current time step, the propagation time measurement unit 510 may include, in a first message, a first time stamp that is a transmission time of the first message, and transmit the first message to the master node. For example, the master node may include, in a second message, the first time stamp, a second time stamp that is a receipt time of the first message, and a third time stamp that is a transmission time of the second message corresponding to the first message, and transmit the second message to the network apparatus 500. The propagation time measurement unit 510 may verify a fourth time stamp that is a receipt time of the second message. The propagation time measurement unit 510 may measure the propagation time at the current time stamp using the four time stamps.

The average propagation time value computing unit 520 may compute an average propagation time value at a $(k+1)^{th}$ time step. The average propagation time value computing unit 520 may include a buffer to maintain M propagation time measurement values. When k is less than a sliding window size M, the average propagation time value computing unit 520 may compute the average propagation time value at the $(k+1)^{th}$ time step according to a first computation formula. When k is greater than or equal to the sliding window size M, the average propagation time value computing unit 520 may compute the average propagation time value at the $(k+1)^{th}$ time step according to a second computation formula.

The offset computing unit 530 may compute an offset based on a message transmission time at the master node, a message receipt time at the slave node, and the average propagation time value. The offset may be computed using "offset=T2−T1−$D_{ave,k}$."

<A Scheme of Enhancing an Accuracy of a Propagation Time Measurement>

According to an embodiment, an accuracy of a propagation time measurement may be enhanced using an average propagation time value. For example, a time accuracy for a network synchronization may be determined by an application that needs a highest time accuracy among applications used in a corresponding node. For example, an application that needs a time synchronization between an image and a sound may need a relatively low time accuracy compared to an application that determines a frequency value for a mobile communication.

Figure 6:
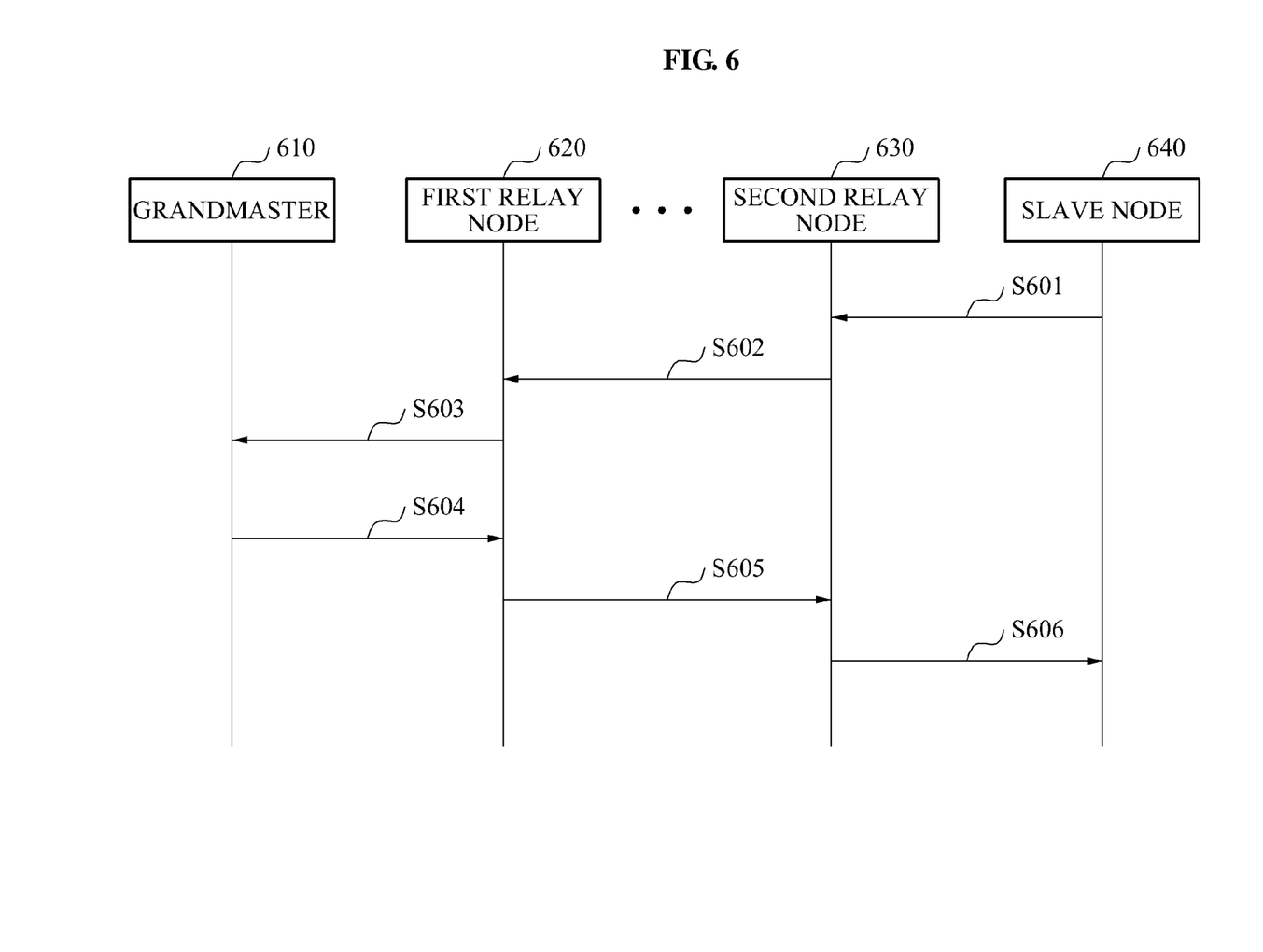
FIG. 6 illustrates a method of enhancing an accuracy in a propagation time measurement according to an embodiment.

FIG. 6 illustrates a method of enhancing an accuracy in a propagation time measurement according to an embodiment.

Referring to FIG. 6, N−1 hops from a grandmaster 610 to a slave node 640 may exist. A total number of N nodes may exist. Different relay nodes may exist between a first relay node 620 and a second relay node 630. The first relay node 620 and the second relay node 630 may each correspond to a time-aware system.

In operation S601, the second relay node 630 may receive a first message from the slave node 640. The first message corresponds to a message that requests performance parameter information associated with a time accuracy. The first message may include a field n to indicate a number of hops. For example, a value of the field n may be "1."

Since the second relay node 630 is not a grandmaster node, the second relay node 630 may transmit a second message to the first relay node 620 in operation S602. The second message corresponds to a message that requests performance parameter information associated with a time accuracy. The second message may include a field n to indicate a number of hops. For example, a value of the field n may be "2."

Since the first relay node 620 is not the grandmaster node, the first relay node 620 may transmit a third message to the grandmaster 620 in operation S603. The third message may include a field n' to indicate a number of hops. For example, a value of the field n' may be "n'=n+1."

The first message, the second message, and the third message may include performance parameter information of a corresponding node. The performance parameter information of the corresponding node may include at least one of a digital filter type, a digital filter size, a sliding window size, and a local clock performance. The second message and the third message may further include performance parameter information of a previous node. Specifically, the second message may include performance parameter information of the slave node 640 and performance parameter information of the second relay node 630. The third message may include performance parameter information of the slave node 640, performance parameter information of the second relay node 630, and performance parameter information of the first relay node 620.

Accordingly, when generally describing operations S601 through S603 as an operation performed at a random relay node, the description may be made as follows: When the random relay node is presumed as an $(N-2)^{th}$ relay node, the $(N-2)^{th}$ relay node may receive a performance parameter request message from an $(N-1)^{th}$ relay node, and determine whether the $(N-2)^{th}$ relay node is the grandmaster node. When the $(N-2)^{th}$ relay node is not the grandmaster node, the $(N-2)^{th}$ relay node may transfer, to an $(N-3)^{th}$ relay node, the performance parameter request message received from the $(N-1)^{th}$ relay node. For example, the performance parameter request message received from the $(N-1)^{th}$ relay node may include performance parameter information of the $(N-1)^{th}$ relay node. The performance parameter request message transferred to the $(N-3)^{th}$ relay node may include performance parameter information of the $(N-1)^{th}$ relay node and performance parameter information of the $(N-2)^{th}$ relay node.

When the grandmaster 610 receives the third message, the grandmaster 610 may generate a performance table. The performance table may include performance parameter information of N−2 relay nodes and performance parameter information of the slave node 640. The grandmaster 610 may generate a performance information packet containing performance parameter information of all nodes, using the generated performance table, and may return the performance information packet. The performance information packet may be transferred to the slave node 640 through operations S604, S605, and S606.

The performance information packet may be updated in each node and then be transferred to a subsequent node. For example, the first relay node 620 may update information of the first relay node 620 that is included in the performance information packet and then transfer the updated performance information packet to the second relay node 630.

The slave node 640 or the grandmaster 610 may request each relay node to change a performance parameter by referring to the information performance packet or the performance table. For example, the slave node 640 or the grandmaster 610 may request each relay node to increase the sliding window size or to change a filter constant. When an application currently in use needs a high time accuracy, the slave node 640 may request each relay node to increase the sliding window size or to change the filter constant.

Operations S601 through S603 may be performed after operation S330 of FIG. 3. Each node may perform operations S601 through S606 prior to the propagation time measurement, or may periodically or aperiodically perform operations S601 through S606. Each node may periodically or aperiodically perform operations S601 through S606 to enhance an accuracy of a propagation time measurement.

<Signaling for a Parameter Setting>

Figure 7:
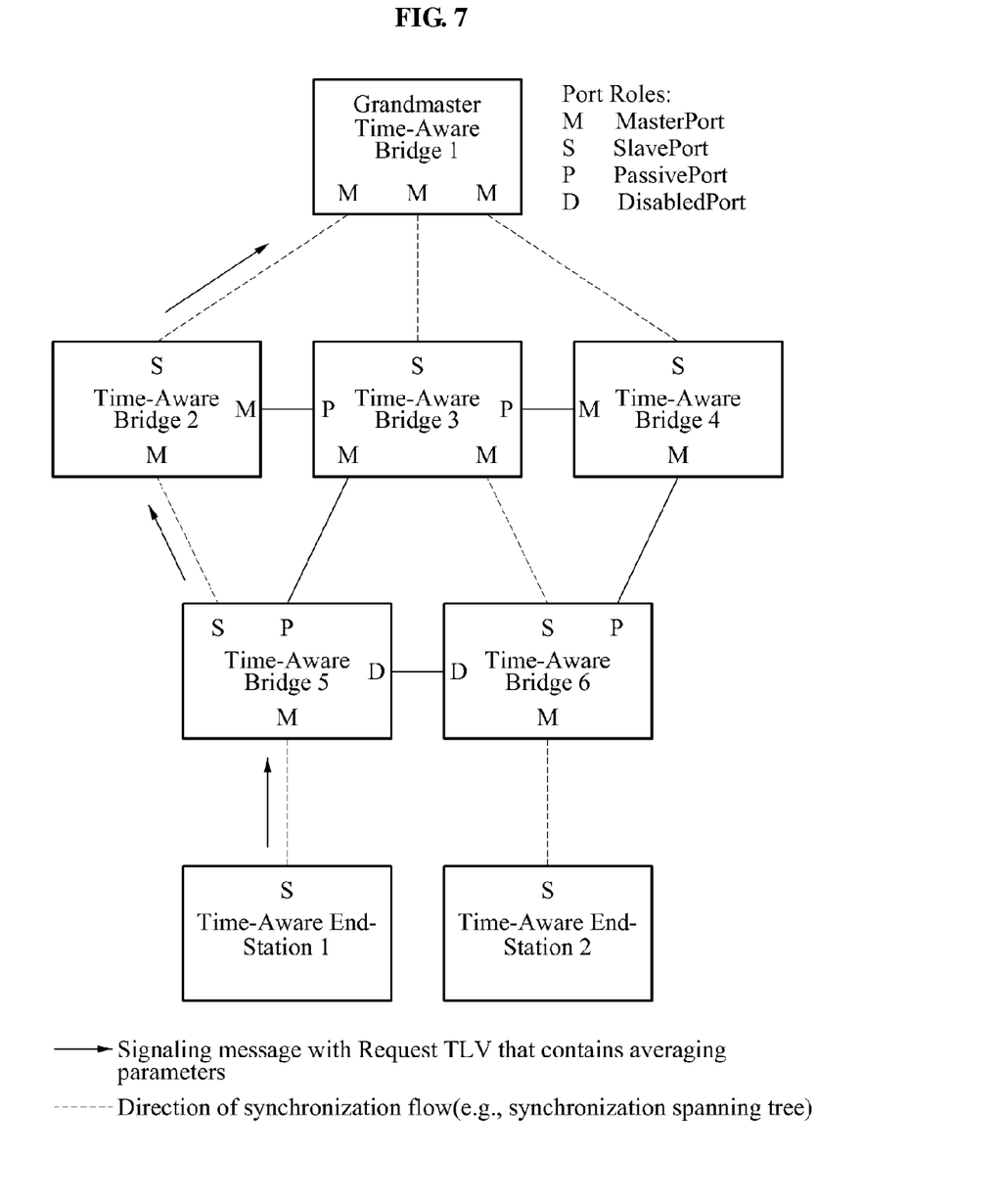
FIGS. 7 through 9 illustrate a signaling for a parameter setting according to an embodiment.
Figure 8:
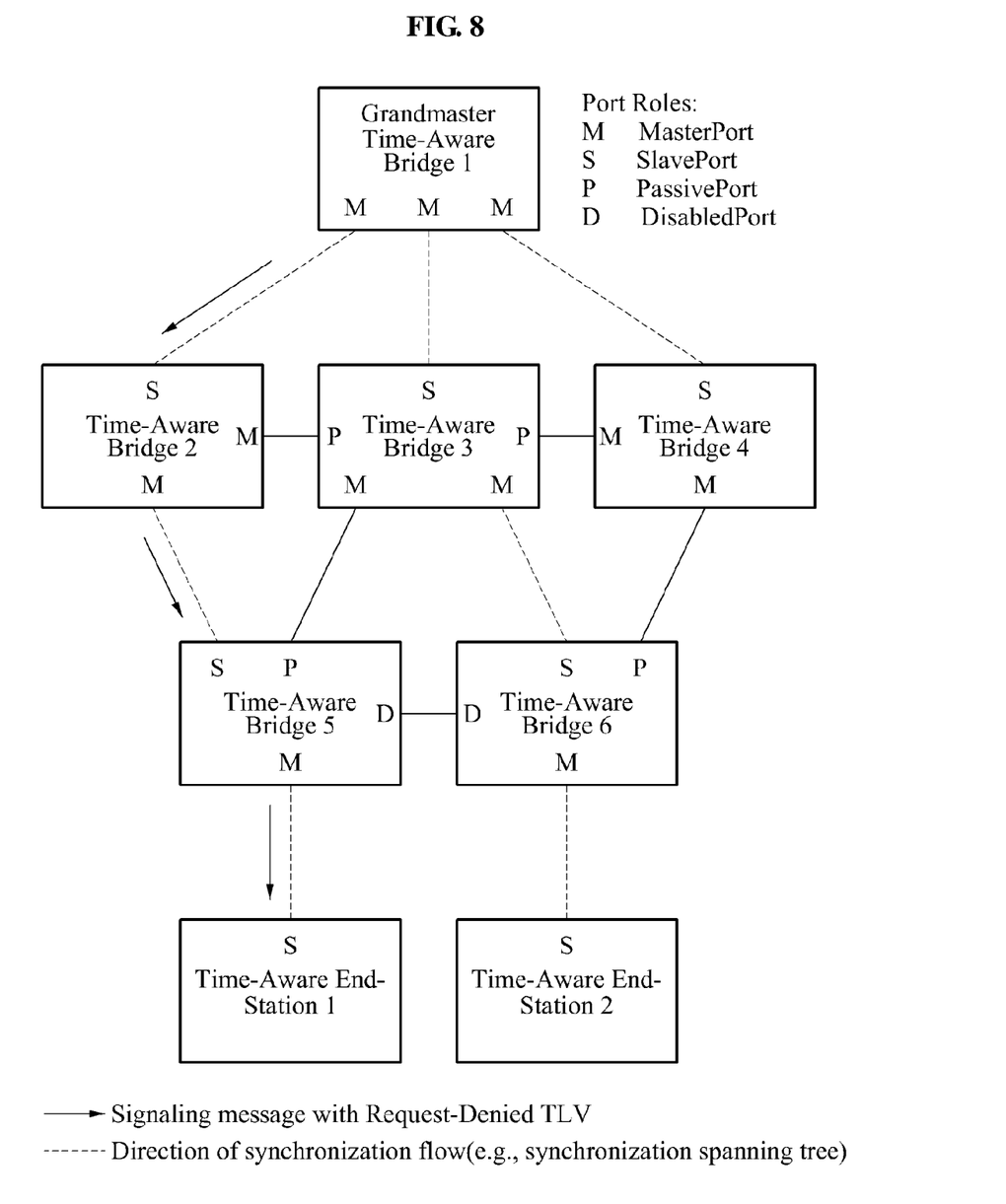
Figure 9:
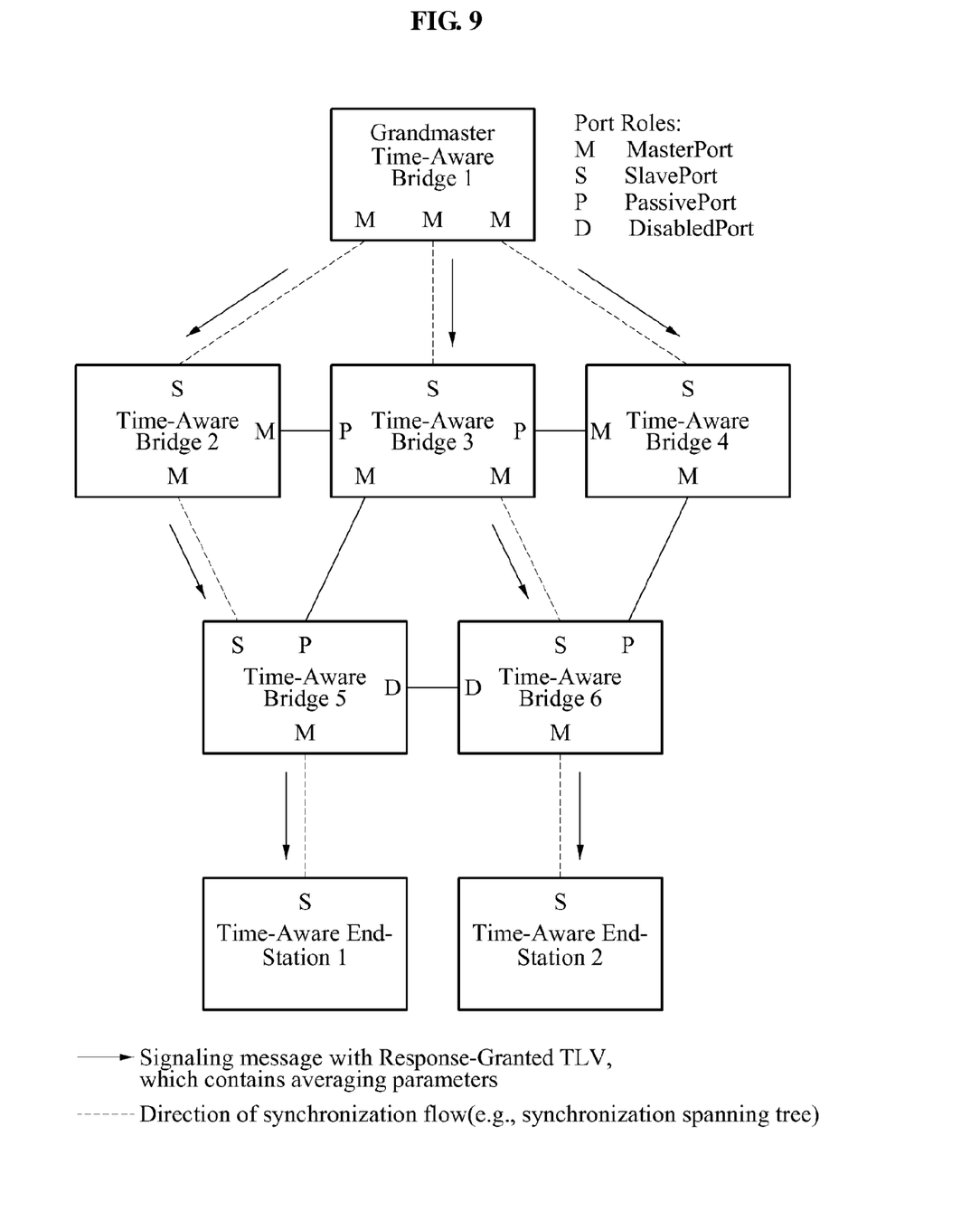

FIGS. 7 through 9 illustrate a signaling for a parameter setting according to an embodiment. The signaling of FIGS. 7 through 9 may be applicable when the slave node 640 or the grandmaster 610 requests each relay node to change a performance parameter. Also, the signaling may be applicable to set a parameter for computing an average propagation time value. The parameter for computing the average propagation value may be, for example, a window size. The signaling may be applicable to set a parameter necessary in a network. In FIGS. 7 through 9, time-aware bridges 2, 3, 4, 5, and 6 may perform a relay node function.

The signaling may be performed by transmitting a signaling message. The signaling message may carry information, requests, and/or commands between time-aware systems. The signaling message may transfer the information, the requests, and/or the commands using at least one type-length-value (TLV).

FIG. 7 illustrates an example where a time-aware end-station 1 requests a parameter setting. The time-aware end-station 1 may perform a slave node function. The time-aware end-station 1 may transfer a first signaling message with a request TLV to the time-aware bridge 5. The first signaling message may correspond to a message that requests to set a parameter for computation of the average propagation time value using values included in the request TLV.

The time-aware bridge 5 may receive the first signaling message via a master port, store information associated with the request TLV, and then transfer the request TLV using a second signaling message. For example, information associated with the request TLV may be, for example, a sequence number of the first signaling message and a TLV type. In this instance, information associated with the request TLV may be stored so that a request-denied TLV may be transferred only via an inverse path of a transfer path of the request TLV when the parameter setting request is denied.

As shown in FIG. 7, the request TLV may be forwarded to a grandmaster time-aware bridge 1 via the time-aware bridge 2. The grandmaster time-aware bridge 1 may perform the same function as the grandmaster 610 of FIG. 6. The grandmaster time-aware bridge 1 may also store information associated with the request TLV. The grandmaster time-aware bridge 1 may determine a grant or a denial with respect to the parameter setting request. Whether to grant or deny the parameter setting request may be determined based on performance parameter information.

FIG. 8 illustrates an example where a parameter setting request is denied at the grandmaster time-aware bridge 1. In FIG. 8, a request-denied TLV corresponds to a signaling message indicating that the parameter setting request is denied.

Referring to FIG. 8, when the time-aware bridge 2 receives the request-denied TLV, The time-aware bridge 2 may remove information associated with a pre-stored request TLV, and transfer the request-denied TLV. As shown in FIG. 8, the request-denied TLV may be transferred to the time-aware end-station 1.

FIG. 9 illustrates an example where a parameter setting request is granted at the grandmaster time-aware bridge 1.

When the parameter setting request is granted, the grandmaster time-aware bridge 1 may set a parameter for computation of the average time propagation value using values included in the request TLV. The grandmaster time-aware bridge 1 may remove information associated with a pre-stored request TLV, and transfer a request-granted TLV. The request-granted TLV indicates that the parameter setting request is granted. The request-granted TLV may be transferred via all master ports of the grandmaster time-aware bridge 1, which is different from the request-denied TLV. Accordingly, the time-aware bridges 2, 3, and 4 may receive the request-granted TLV.

The time-aware bridges 2, 3, and 4 may set the parameter for computation of the average propagation time value using values included in the request-granted TLV, and may transfer the request-granted TLV via corresponding master ports. In this instance, the time-aware bridge 2 may remove information associated with a pre-stored request TLV, and transfer the request-granted TLV. When a time-aware end-station 2 receives the request-granted TLV, the time-aware end-station 2 may set the parameter for computation of the average propagation time value using the values included in the request-granted TLV. The time-aware end-station 2 may not transfer the request-granted TLV.

According to the signaling described with reference to FIGS. 7 through 9, a signaling message for a parameter setting may be transferred to a grandmaster. When a parameter setting request is granted, parameters included in the parameter setting request may be transferred to all of nodes included in a network. All the nodes included in the network may set the parameters included in the parameter setting request. Conversely, when the parameter setting request is denied, a parameter setting-denied message may be transferred via only a transfer path of the parameter setting request.

Examples include computer-readable media including program instructions to implement various operations embodied by a computer. The media may also include, alone or in combination with the program instructions, data files, data structures, tables, and the like. The media and program instructions may be those specially designed and constructed for the purposes of examples, or they may be of the kind well known and available to those having skill in the computer software arts.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network synchronization method, comprising:
measuring a propagation time from a slave node to a master node at a $k^{th}$ time step, where k denotes a natural number;
computing an average propagation time value at a $(k+1)^{th}$ time step according to a first computation formula, for k less than a predetermined natural number M, and according to a second computation formula, for k greater than or equal to M; and
computing an offset based on a message transmission time at the master node, a message receipt time at the slave node, and the average propagation time value, wherein:
the first computation formula and the second computation formula compute the average propagation time value at the $(k+1)^{th}$ time step using an average propagation time value at the $k^{th}$ time step and the propagation time measured at the $k^{th}$ step time, and
the first computation formula is computed according to the following equation:

$$x_{k+1} = \frac{kx_k + d_k}{k+1},$$

where $x_k$ denotes the average propagation time value at the $k^{th}$ time step, and $d_k$ denotes the propagation time measured at the $k^{th}$ time step.

2. The method of claim 1, wherein the second computation formula is computed according to the following equation:

$$x_{k+1} = ax_k + (1-a)d_k,$$

where k denotes the average propagation time value at the $k^{th}$ time step, $d_k$ denotes the propagation time measured at the $k^{th}$ time step, and a denotes a filter coefficient of a first-order digital filter.

3. The method of claim 2, wherein a increases as M increases.

4. The method of claim 2, wherein a is computed according to the following equation:

$$a = e^{-1/M}.$$

5. The method of claim 2, wherein a is computed according to the following equation:

$$a = e^{-P/M},$$

where P denotes a constant.

6. The method of claim 1, further comprising:
transmitting a performance parameter request message to a relay node; and
receiving a performance information packet corresponding to the performance parameter request message.

7. The method of claim 6, further comprising requesting the relay node to change a performance parameter based on the performance information packet.

8. The method of claim 6, wherein the performance information packet comprises at least one of: a digital filter type, a digital filter size, the value of M, and a local clock performance.

9. The method of claim 1, further comprising:
signaling a parameter setting request for computing the average propagation time value.

10. The method of claim 9, further comprising receiving a grant or a denial with respect to the parameter setting request.

11. The method of claim 9, wherein, in response to the parameter setting request being granted, the parameter setting request is transferred to all nodes included in the network.

12. A network synchronization apparatus for performing a time synchronization between nodes, the apparatus comprising:
a propagation time measurement device configured to measure a propagation time from a slave node to a master node at a $k^{th}$ time step where k denotes a natural number;
an average propagation time value computing device configured to compute an average propagation time value at a $(k+1)^{th}$ time step according to a first computation formula, for k less than a predetermined natural number M, and according to a second computation formula, for k greater than or equal to M; and
an offset computing device configured to compute an offset based on a message transmission time at the master node, a message receipt time at the slave node, and the average propagation time value, wherein:
the average propagation time value computing device is further configured to compute the first computation formula according to the following equation:

$$x_{k+1} = \frac{kx_k + d_k}{k+1},$$

where $x_k$ denotes the average propagation time value at the $k^{th}$ time step, and $d_k$ denotes the propagation time measured at the $k^{th}$ time step.

13. The apparatus of claim 12, wherein the average propagation time value computing device is further configured to use the first computation formula and the second computation formula to compute the average propagation time value at the $(k+1)^{th}$ time step using the average propagation time value at the $k^{th}$ time step and the propagation time measured in the $k^{th}$ step time.

14. The apparatus of claim 12, wherein the average propagation time value computing device is further configured to compute the second computation formula according to the following equation:

$$x_{k+1} = ax_k + (1-a)d_k,$$

where k denotes the average propagation time value at the $k^{th}$ time step, $d_k$ denotes the propagation time measured at the $k^{th}$ time step, and a denotes a filter coefficient of a first-order digital filter.

15. The apparatus of claim 14, wherein a increases as M increases.

16. The apparatus of claim 14, wherein the average propagation time value computing device is further configured to compute a according to the following equation:

$$a = e^{-1/M}.$$

17. The apparatus of claim 14, wherein the average propagation time value computing device is further configured to compute a according to the following equation:

$$a = e^{-P/M},$$

where P denotes a constant.

* * * * *